United States Patent
Okada et al.

(10) Patent No.: US 7,702,052 B2
(45) Date of Patent: Apr. 20, 2010

(54) RADIO-FREQUENCY RECEIVER AND INTEGRATED CIRCUIT EMPLOYED FOR THE RECEIVER

(75) Inventors: Eiji Okada, Osaka (JP); Hiroaki Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 298 days.

(21) Appl. No.: 11/722,027

(22) PCT Filed: Aug. 4, 2006

(86) PCT No.: PCT/JP2006/315459

§ 371 (c)(1), (2), (4) Date: Jun. 18, 2007

(87) PCT Pub. No.: WO2007/018134

PCT Pub. Date: Feb. 15, 2007

(65) Prior Publication Data

US 2009/0274249 A1 Nov. 5, 2009

(30) Foreign Application Priority Data

Aug. 5, 2005 (JP) ............................. 2005-228166

(51) Int. Cl.
*H04B 7/10* (2006.01)
(52) U.S. Cl. ............... 375/347; 375/349; 455/196.1
(58) Field of Classification Search ............ 375/347, 375/349, 327, 328, 339; 455/180.3, 196.1, 455/197.3, 315, 318
See application file for complete search history.

(56) References Cited

U.S. PATENT DOCUMENTS

| 6,115,473 | A  | * | 9/2000  | Takagi ........................... 381/2 |
| 6,411,660 | B1 | * | 6/2002  | Oh ............................... 375/327 |
| 7,181,181 | B2 | * | 2/2007  | Lee et al. .................... 455/260 |
| 7,346,136 | B1 | * | 3/2008  | Aiello .......................... 375/347 |
| 7,529,533 | B2 | * | 5/2009  | Bellantoni ................... 455/334 |
| 2001/0031025 | A1 | * | 10/2001 | Nguyen ....................... 375/349 |
| 2004/0190658 | A1 | * | 9/2004  | Ohtaki et al. ............... 375/347 |

FOREIGN PATENT DOCUMENTS

| JP | 5-191312 A | 7/1993 |
| JP | 2003-249866 A | 9/2003 |
| JP | 2004-88714 A | 3/2004 |
| JP | 2005-20136 A | 1/2005 |
| JP | 2005-136687 A | 5/2005 |

OTHER PUBLICATIONS

Japanese International Search Report for PCT/JP2006/315459, dated Oct. 24, 2006.

* cited by examiner

*Primary Examiner*—Kevin Y Kim
(74) *Attorney, Agent, or Firm*—RatnerPrestia (57) ABSTRACT

Radio-frequency receiver contains a plurality of oscillation circuits that generates an oscillation frequency higher than that of digital broadcasting signals, selective switching circuit that selects two out of the oscillation circuits for signal output, and first and second frequency-divider sections that provide the signals with frequency dividing. The receiver receives two channels in the digital broadcasting signals at the same time by selection of oscillation signals and frequency dividing in the first and the second frequency-divider sections under the control of PLL controller.

12 Claims, 7 Drawing Sheets

RADIO-FREQUENCY RECEIVER AND INTEGRATED CIRCUIT EMPLOYED FOR THE RECEIVER

This application is a U.S. National Phase Application of PCT International Application PCT/JP2006/315459.

TECHNICAL FIELD

The present invention relates to a mobile radio-frequency receiver formed of two radio-frequency receiver sections for receiving digital broadcasting signals and also relates to an integrated circuit employed for the radio-frequency receiver.

BACKGROUND ART

Figure 7:
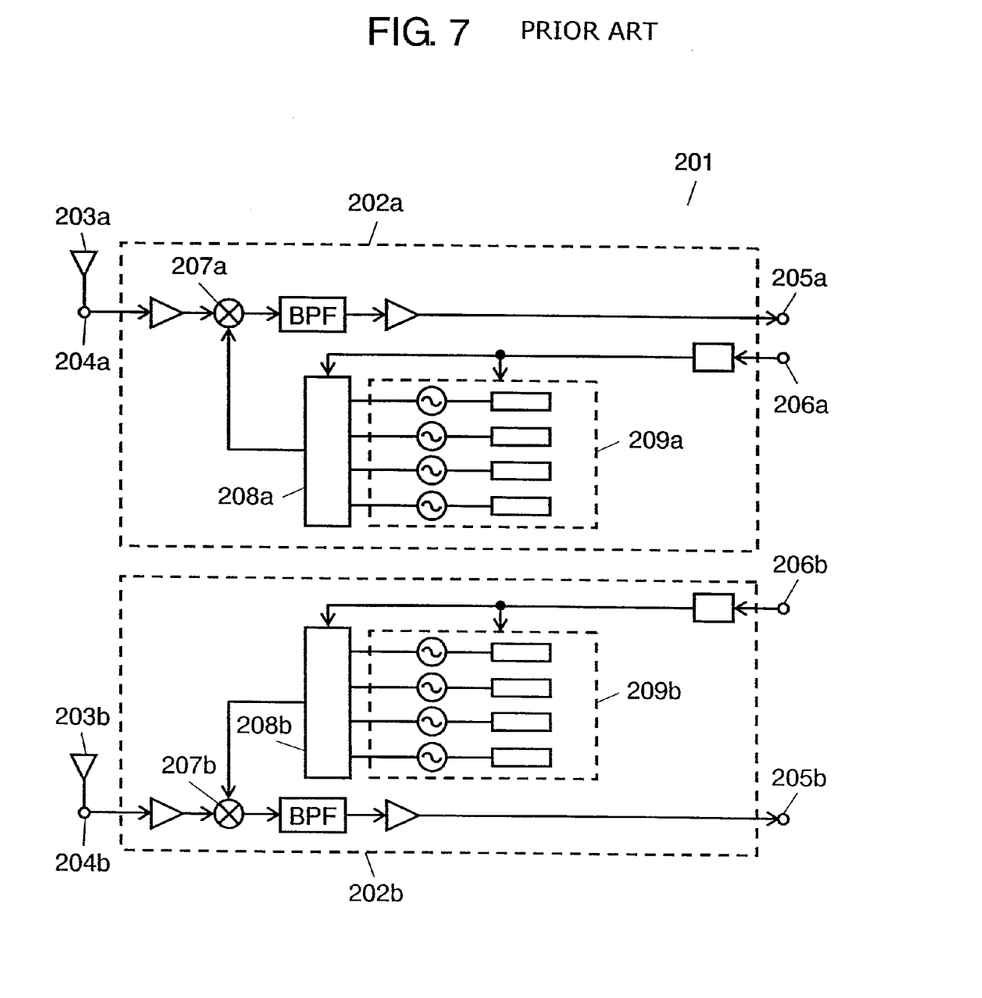
FIG. 7 is a block diagram illustrating a conventional structure of a radio-frequency receiver.

Japanese Patent Unexamined Publication No. H05-191312 discloses a conventional radio-frequency receiver. As shown in FIG. 7, conventional radio-frequency receiver 201 contains radio-frequency receiving circuits 202a and 202b that are identical in construction. Radio-frequency circuit 202a (202b) contains input terminal 204a (204b) that receives digital broadcasting signals from antenna 203a (203b), output terminal 205a (205b) that carries output signals and PLL-control terminal 206a (206b) that carries PLL-control signals. Radio-frequency receiving circuits 202a and 202b are accommodated in a same housing.

Besides, radio-frequency receiving circuit 202a (202b) contains mixer 207a (207b) and oscillation circuit 209a (209b). Mixer 207a (207b) receives a signal from input terminal 204a (204b) and sends it to output terminal 205a (205b). Mixer 207a (207b) also receives an oscillation signal from oscillation circuit 209a (209b) via selective switching section 208a (208b).

Such structured radio-frequency receiver 201 is usually battery-operated, for example, at a low voltage of 3V. It is therefore difficult to supply high tuning voltage to variable capacitance diodes that constitute oscillation circuits 209a and 209b in terms of decreasing power consumption and noise.

To address the problem, each of oscillation circuits 209a and 209b contains four connected units of an oscillator and a tuning circuit: three units for selectively receiving all channels (hereinafter abbreviated to ch) in the UHF (ultra high frequency) band; and one unit for receiving 7-ch in the VHF (very high frequency) band.

That is, conventional radio-frequency receiver 201, since having two radio-frequency receiving circuits 202a and 202b, needs eight units of the oscillator and the tuning circuit in total.

The tuning circuit is formed of a capacitor and an inductor connected in parallel; the inductor has a large footprint in the circuit. This has been an obstacle to reduction in size of an integrated circuit; accordingly, an obstacle to reduction in size of a radio-frequency receiver.

SUMMARY OF THE INVENTION

The radio-frequency receiver of the present invention has two radio-frequency receiver sections for receiving digital broadcasting signals. The two radio-frequency receiver sections contain a first and a second input terminals for receiving digital broadcasting signals; a first mixer whose one input receives the signals from the first input terminal; a second mixers whose one input receives the signals from the second input terminal; a first output terminal for receiving signals fed from the first mixer; a second output terminal for receiving signals fed from the second mixer; a PLL controller; a plurality of low-voltage-driven oscillation circuits that is connected to the PLL controller and oscillates at a frequency higher than the digital broadcasting signals; a first selective switching circuit which is connected to the output of plurality of oscillation circuits and to the PLL controller for controlling, and has a first terminal and a second terminal; a first frequency-divider section connected to the first terminal and another input of the first mixer; and a second frequency-divider section connected to the second terminal and another input of the second mixer. The PLL controller controls the first selective switching circuit so that the plurality of oscillation circuits is selectively connected to each of the first and the second terminals. Besides, the first and the second frequency-divider sections have variable frequency-dividing rate.

In the aforementioned structure of the present invention, an inductor constituting the oscillation circuits, which has been an obstacle to miniaturization, is shared between the first and the second radio-frequency receiver sections. This allows the radio-frequency receiver to be compact.

Besides, the oscillation circuits operate at an oscillation frequency higher than the digital broadcasting signal, allowing the inductor to be more compact. As a result, the radio-frequency receiver can be further downsized.

REFERENCE MARKS IN THE DRAWINGS 12a, 12b input terminal
13a, 13b output terminal
16a, 16b mixer
21, 29 oscillator section
22a, 22b frequency-divider section
24a, 24b, 24c, 24d, 24e oscillation circuit
25, 28 selective switching circuit
35 PLL controller

DETAILED DESCRIPTION OF THE PREFERRED EMBODIMENTS

The exemplary embodiments of the present invention are described hereinafter with reference to the accompanying drawings.

First Exemplary Embodiment

Figure 1:
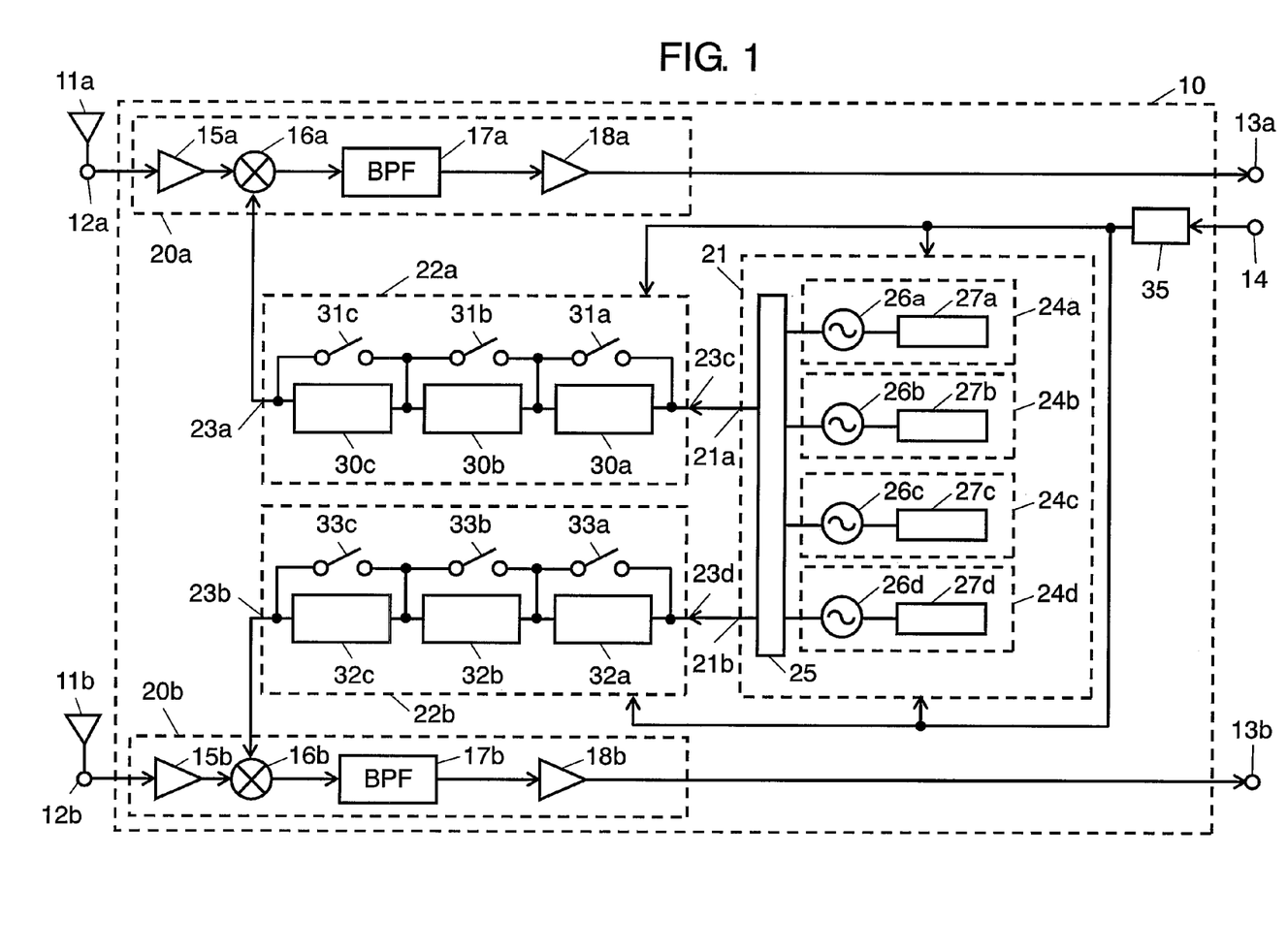
FIG. 1 is a block diagram illustrating the structure of a radio-frequency receiver in accordance with a first exemplary embodiment of the present invention.

FIG. 1 is a block diagram illustrating the structure of radio-frequency receiver 10 in accordance with the first exemplary embodiment of the present invention. The first exemplary embodiment describes the structure employing a direct-conversion type frequency converter in receiving digital broadcasting signals in the UHF band. Mixer 16a as a first mixer and mixer 16b as a second mixer are direct-conversion type frequency converters. Mixer 16a is so structured that the frequency of the digital broadcasting signals fed into one input of mixer 16a equals to the frequency for conversion fed into another input of mixer 16a. Similarly, Mixer 16b is so structured that the frequency of the digital broadcasting signals fed into one input of mixer 16b equals to the frequency for conversion fed into another input of mixer 16b.

Radio-frequency receiver 10 of FIG. 1 contains radio-frequency receiver sections 20a, 20b; PLL (phase locked loop)-control terminal 14 that receives PLL-control signals; PLL-controller 35 connected to PLL control terminal 14; frequency-divider section 22a that is a first frequency-divider connected to radio-frequency receiver section 20a; frequency-divider section 22b that is a second frequency-divider connected to radio-frequency receiver section 20b; and oscillator section 21 connected to frequency-divider sections 22a and 22b.

Radio-frequency receiver section 20a contains input terminal 12a as a first input terminal that receives digital broadcasting signals from antenna 11a and output terminal 13a as a first output terminal that receives output signals. Between input terminal 12a as the first input terminal and output terminal 13a, the following components are connected in the order named: amplifier 15a, mixer 16a, band-pass filter 17a and amplifier 18a. That is, the output of amplifier 15a is fed into one input of mixer 16a.

Radio-frequency receiver section 20b contains input terminal 12b as a second input terminal that receives digital broadcasting signals from antenna 11b and output terminal 13b as a second output terminal that receives output signals. Between input terminal 12b and output terminal 13b, the following components are connected in the order named: amplifier 15b, mixer 16b, band-pass filter 17b and amplifier 18b. That is, the output of amplifier 15b is fed into one input of mixer 16a.

Another input of mixer 16a receives oscillation signals from oscillator section 21 via output terminal 23a of frequency-divider section 22a. Similarly, another input of mixer 16b receives oscillation signals from oscillator section 21 via output terminal 23b of frequency-divider section 22b.

Oscillator section 21 contains four oscillation circuits 24a, 24b, 24c, 24d; and selective switching circuit 25 as a first selective switching circuit. Selective switching circuit 25 has terminal 21a as a first terminal and terminal 21b as a second terminal. Under the control of PLL controller 35, selective switching circuit 25 selects two out of the outputs from the four oscillation circuits 24a through 24d and send them to terminals 21a and 21b. Oscillation circuit 24a is a series-connected unit of oscillator 26a and tuning circuit 27a. Similarly, oscillation circuit 24b is a series-connected unit of oscillator 26b and tuning circuit 27b; Oscillation circuit 24c is a series-connected unit of oscillator 26c and tuning circuit 27c; and oscillation circuit 24d is a series-connected unit of oscillator 26d and tuning circuit 27d. When a variable capacitance diode has a large variable capacitance range in tuning voltage, the range of the oscillation frequency expands. In this case, the number of the oscillation circuits can be reduced.

The oscillation signal from terminal 21a of selective switching circuit 25 is fed into input terminal 23c of frequency-divider section 22a. Between input terminal 23c and output terminal 23a of frequency-divider section 22a, frequency dividers 30a, 30b and 30c are connected in series in the order named. Of three dividers 30a, 30b and 30c, two dividers have a frequency-dividing rate of $\frac{1}{2}$; and the rest one has a frequency-dividing rate of $\frac{1}{3}$. The embodiment describes the structure having divider 30a with a frequency-dividing rate of $\frac{1}{3}$ and dividers 30b, 30c with a frequency-dividing rate of $\frac{1}{2}$.

Electronic switches 31a, 31b and 31c are connected in parallel to frequency dividers 30a, 30b and 30c, respectively.

On the other hand, the oscillation signal from terminal 21b of selective switching circuit 25 is fed into input terminal 23d of frequency-divider section 22b. Between input terminal 23d and output terminal 23b of frequency-divider section 22b, frequency dividers 32a, 32b and 32c are connected in series in the order named. Of three dividers 32a, 32b and 32c, two dividers have a frequency-dividing rate of $\frac{1}{2}$; and the rest one has a frequency-dividing rate of $\frac{1}{3}$. The embodiment describes the structure having divider 32a with a frequency-dividing rate of $\frac{1}{3}$ and dividers 32b, 32c with a frequency-dividing rate of $\frac{1}{2}$.

Electronic switches 33a, 33b and 33c are connected in parallel to frequency dividers 32a, 32b and 32c, respectively.

PLL-control terminal 14 for receiving PLL-control data is connected to PLL controller 35. PLL controller 35 sends control signals to selective switching circuit 25 of oscillator section 21; oscillators 26a, 26b, 26c, and 26d; and frequency-divider sections 22a and 22b.

Integrating mixers 16a, 16b; frequency-divider sections 22a, 22b; oscillator section 21; and PLL controller 35 into a package provides a size-reduced integrated circuit. In the integrated circuit used for radio-frequency receiver 10 of the first exemplary embodiment, at least the following components are integrated into the same package: mixer 16a as a first mixer; mixer 16b as a second mixer; frequency-divider section 22a as a first frequency-divider; frequency-divider section 22b as a second frequency-divider; oscillator section 21 containing a plurality of oscillation circuits (24a, 24b, 24c, 24d) and selective switching circuit 25 as a first selective switching circuit; and PLL controller 35.

Hereinafter will be described radio-frequency receiver 10 having the structure above.

Digital broadcasting signals, for example, digital broadcasting signals of 13-ch through 62-ch in the UHF band are captured by antennas 11a and 11b and sent to input terminals 12a and 12b. The signals fed from terminals 12a and 12b are then amplified by gain-controllable amplifiers 15a and 15b, respectively.

The output signals from amplifiers 15a and 15b are fed into one input of mixers 16a and 16b, respectively. Mixers 16a and 16b are direct-conversion type frequency converters. Frequency-divider sections 22a and 22b feed signals, which have the same frequency as the digital broadcasting signals fed into the aforementioned input terminal of mixers 16a and 16b, to another input of mixers 16a and 16b.

The output signals from mixers 16a and 16b are fed into band-pass filters 17a and 17b where an interfering signal is suppressed. The output signals from the band-pass filters 17a and 17b enters into amplifiers 18a and 18b, and the amplified signals go out of output terminals 13a and 13b.

Next will be described the output signals, which are fed into another input of mixers 16a and 16b from frequency-divider sections 22a and 22b, with reference to FIG. 2.

Figure 2:
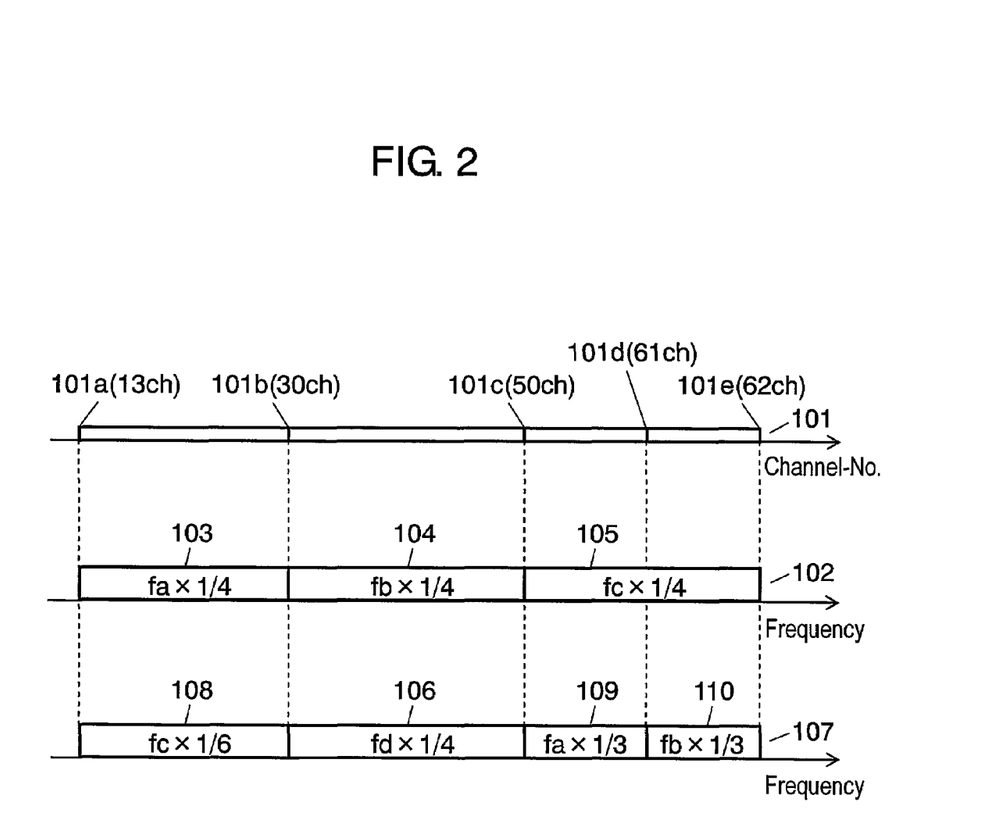
FIG. 2 shows a relationship between channel assignment of all channels in the UHF band and the frequencies of signals fed into another input of a mixer of the radio-frequency receiver in accordance with the first exemplary embodiment.

FIG. 2 shows a relationship between channel assignment (hereinafter, ch-assignment) of all channels in the UHF band and the frequencies of signals fed into another input of mixers 16a and 16b of radio-frequency receiver 10 in the embodiment. The uppermost of FIG. 2 shows ch-assignment 101 in the UHF band. The channels are horizontally shown in the order of increasing their numbers toward the right. The channels of 13-ch, 30-ch, 50-ch, 61-ch and 62-ch are represented as 101a, 101b, 101c, 101d and 101e, respectively.

Radio-frequency receiver 10, since it is designed for a mobile receiver, is usually driven by battery, for example, with a low voltage of 3V. Such a low voltage cannot provide the variable capacitance diode of the tuning circuit of oscillator section 21 with high tuning voltage unless a DC-DC converter is employed.

Oscillator section 21 needs two or more oscillators because a single oscillator cannot cover all the frequencies. The structure of the first exemplary embodiment contains, as shown in FIG. 1, oscillation circuit 24a formed of oscillator 26a and tuning circuit 27a; oscillation circuit 24b formed of oscillator 26b and tuning circuit 27b; and oscillation circuit 24c formed of oscillator 26c and tuning circuit 27c.

The middle section of FIG. 2 shows frequency 102 of the signal fed into another input of mixer 16a. Frequency 102 is divided into frequency bands 103, 104 and 105 in the horizontal direction. The oscillating frequencies from oscillation circuits 24a, 24b and 24c are divided by frequency-divider section 22a into the signal frequencies of frequency bands 103, 104 and 105, respectively.

With the use of two frequency-dividers each of which has a frequency-dividing rate of ½, the frequency-dividing rate of frequency-divider section 22a is determined to be ¼ under the control of PLL controller 35. That is, each of oscillating frequencies 2411 (for oscillation circuit 24a), 2412 (for oscillation circuit 24b), 2413 (for oscillation circuit 24c) is given a frequency ranging from 1892 MHz to 3068 MHz, which is four-times higher than the signal frequencies of all the channels in the UHF band. Employing a high oscillation frequency allows the inductors of tuning circuits 27a, 27b and 27c to be reduced in size. This is also true with tuning circuit 27d of oscillation circuit 24d, which will be described later.

As described above, frequency 102 (FIG. 2) is fed into another input of mixer 16a. Frequency band 103 ranges from frequency 101a (13-ch) as the lowest to frequency 101b (30-ch) as the highest. That is, oscillation frequency 2411 of oscillation circuit 24a for receiving frequency band 103 should take oscillation frequency 2411 ranging from 1892 MHz (=473 MHz×4, that is, four-times higher than frequency 101a (13-ch) as the lowest in band 103) to 2300 MHz (=575 MHz×4, that is, four-times higher than frequency 101b (30-ch) as the highest). In frequency-divider section 22a, electronic switch 31a only turns on, whereas switches 31b and 31c turn off, so that frequency-divider section 22a serves as a divider for dividing a frequency into ¼. FIG. 2 shows frequency band 103 as fa×¼; where, fa represents oscillation frequency 2411.

Similarly, frequency band 104 ranges from frequency 101b (30-ch) as the lowest to frequency 101c (50-ch) as the highest. That is, oscillation circuit 24b should take oscillation frequency 2412 ranging from 2300 MHz (=575 MHz×4, that is, four-times higher than frequency 101b (30-ch) as the lowest in band 104) to 2780 MHz (=695 MHz×4, that is, four-times higher than frequency 101c (50-ch) as the highest). In frequency-divider section 22a, the switch selection is the same as that for receiving frequency band 103, that is, frequency-divider section 22a divides a frequency into ¼. FIG. 2 shows frequency band 104 as fb×¼; where, fb represents oscillation frequency 2412.

Similarly, frequency band 105 ranges from frequency 101c (50-ch) as the lowest to frequency 101e (62-ch) as the highest. That is, oscillation circuit 24c should take oscillation frequency 2413 ranging from 2780 MHz (=695 MHz×4, that is, four-times higher than frequency 101c (50-ch) as the lowest in band 105) to 3068 MHz (=767 MHz×4, that is, four-times higher than frequency 101e (62-ch) as the highest). In frequency-divider section 22a, the switch selection is the same as that for receiving frequency band 103, that is, frequency-divider section 22a divides a frequency into ¼. FIG. 2 shows frequency band 105 as fc×¼; where, fc represents oscillation frequency 2413.

Receiving a control signal from PLL controller 35, any one of oscillation circuits 24a, 24b and 24c becomes active. Selective switching circuit 25 selects the oscillation signal from the "turned-on" oscillation circuit and sends the signal to frequency-divider section 22a. As described earlier, frequency-divider section 22a has a frequency-dividing rate of ¼ under the control of PLL controller 35. In this way, mixer 16a receives, through another input, an output signal in a range of 473 MHz to 767 MHz fed from output terminal 23a of frequency-divider section 22a.

With the structure above, a desired signal is selected from the broadcasting signals of all the channels ranging from 13-ch to 62-ch received at radio-frequency receiver section 20a.

It has demonstrated that oscillation frequency 2411 of oscillation circuit 24a has a ratio of the lowest frequency to the highest frequency of 1.5 or greater; here in the structure, a conservative ratio of 1.2 is given to oscillation circuit 24a in consideration of a margin of the oscillation frequency. Oscillation circuits 24b, 24c and 24d have a ratio the same as is determined in oscillation circuit 24a.

Adding oscillation circuit 24d to the structure above, as shown in FIG. 1, allows radio-frequency receiver sections 20a and 20b to receive different channels with each other in the broadcasting signals of all the channels in the UHF band. The structure will be described hereinafter.

The bottom section of FIG. 2 shows frequency 107 of the signal fed into another input of mixer 16b. Frequency 107 is divided into frequency bands 108, 106, 109 and 110 in the horizontal direction. Oscillating frequencies 2413 (of oscillation circuit 24c), 2414 (of oscillation circuit 24d), 2411 (of oscillation circuit 24a) and 2412 (of oscillation circuit 24b) are divided by frequency-divider section 22b into the signal frequencies of frequency bands 108, 106, 109 and 110, respectively. Frequency-divider section 22b serves as a frequency divider with the following frequency dividing ratio: 6/1 for circuit 24c; ¼ for circuit 24d; ⅓ for circuit 24a and circuit 24b.

Frequency 107 (FIG. 2) is fed into another input of mixer 16b. Frequency band 108 ranges from frequency 101a (13-ch) as the lowest to frequency 101b (30-ch) as the highest. That is, oscillation circuit 24c should take oscillation frequency 2413 ranging from 2838 MHz (=473 MHz×6, that is, six-times higher than frequency 101a (13-ch) as the lowest in band 107) to 3450 MHz (=575 MHz×6, that is, six-times higher than frequency 101b (30-ch) as the highest). In frequency-divider section 22b, electronic switch 33c only turns on, whereas switches 33a and 33b turn off, so that frequency-divider section 22b serves as a divider for dividing a frequency into ⅙. FIG. 2 shows frequency band 108 as fc×⅙; where, fc represents oscillation frequency 2413.

Similarly, frequency band 106 ranges from frequency 101b (30-ch) as the lowest to frequency 101c (50-ch) as the highest. That is, oscillation circuit 24d should take oscillation frequency 2414 ranging from 2300 MHz (=575 MHz×4, that is, four-times higher than frequency 101b (30-ch) as the lowest in band 108) to 2780 MHz (=695 MHz×4, that is, four-times higher than frequency 101c (50-ch) as the highest). The switch selection is the same as that for frequency band 104, that is, in frequency-divider section 22b, electronic switch 33a only turns on, whereas switches 33b and 33c turn off, so that frequency-divider section 22b serves as a divider for dividing a frequency into ¼. FIG. 2 shows frequency band 106 as fd×¼; where, fd represents oscillation frequency 2414.

Frequency band 109 ranges from frequency 101c (50-ch) as the lowest to frequency 101d (61-ch) as the highest. That is, oscillation circuit 24a should take oscillation frequency 2411 ranging from 2085 MHz (=695 MHz×3, that is, three-times higher than frequency 101c (50-ch) as the lowest in band 109) to 2283 MHz (=761 MHz×3, that is, three-times higher than frequency 101d (61-ch) as the highest). In frequency-divider section 22b, electronic switch 33a only turns off, whereas switches 33b and 33c turn on, so that frequency-divider section 22b serves as a divider for dividing a frequency into ⅓. FIG. 2 shows frequency band 109 as fa×⅓; where, fa represents oscillation frequency 2411.

Frequency band 110 ranges from frequency 101d (61-ch) as the lowest to frequency 101e (62-ch) as the highest. That is, oscillation circuit 24b should take oscillation frequency 2412 ranging from 2283 MHz (=761 MHz×3, that is, three-times higher than frequency 101d (61-ch) as the lowest in band 110) to 2301 MHz (=767 MHz×3, that is, three-times higher than frequency 101e (62-ch) as the highest). In frequency-divider section 22b, electronic switch 33a only turns off, whereas switches 33b and 33c turn on, so that frequency-divider section 22b serves as a divider for dividing a frequency into ⅓. FIG. 2 shows frequency band 110 as fb×⅓; where, fb represents oscillation frequency 2412.

To be more specific, when the receiver receives signals in the range from 13-ch to 30-ch, oscillation circuit 24a, which is the oscillator for frequency band 103, and oscillation circuit 24c for frequency band 108 become active. The oscillation signal from oscillation circuit 24a is fed into frequency-divider section 22a that serves as a ¼ divider, whereas the signal from oscillation circuit 24c is fed into frequency-divider section 22b that serves as a ⅙ divider. The output signals from frequency-divider sections 22a and 22b are fed into another input of each of mixers 16a and 16b.

When the receiver receives signals in the range from 30-ch to 50-ch, oscillation circuit 24b, which is the oscillator for frequency band 104, and oscillation circuit 24d for frequency band 106 become active. The oscillation signals from oscillation circuits 24b and 24d are fed into frequency-divider sections 22a and 22b, both of which serve as a ¼ divider. The output signals from frequency-divider sections 22a and 22b are fed into another input of each of mixers 16a and 16b.

When the receiver receives signals in the range from 50-ch to 61-ch, oscillation circuit 24c for frequency band 105 and oscillation circuit 24c for frequency band 109 become active. The oscillation signal from oscillation circuit 24c is fed into frequency-divider section 22a that serves as a ¼ divider, whereas the signal from oscillation circuit 24a is fed into frequency-divider section 22b that serves as a ⅓ divider. The output signals from frequency-divider sections 22a and 22b are fed into another input of each of mixers 16a and 16b.

When the receiver receives signals in the range from 61-ch to 62-ch, oscillation circuit 24c for frequency band 105 and oscillation circuit 24d for frequency band 110 become active. The oscillation signal from oscillation circuit 24c is fed into frequency-divider section 22a that serves as a ¼ divider, whereas the signal from oscillation circuit 24d is fed into frequency-divider section 22b that serves as a ⅓ divider. The output signals from frequency-divider sections 22a and 22b are fed into another input of each of mixers 16a and 16b.

As described above, a control signal from PLL controller 35 allows two oscillation circuits out of the four to become active according to a receiving channel. The oscillation signals fed from the two "turned-on" oscillation circuits are selected by selective switching circuit 25 and fed into frequency-divider sections 22a and 22b where the signals undergo frequency dividing. Each of sections 22a and 22b is controlled by PLL controller 35 so as to have a frequency-dividing rate of any one of ⅓, ¼ and ⅙. In this way, each signal having a desired frequency is fed into another input of each of mixers 16a and 16b.

With the structure above, radio-frequency receiver sections 20a and 20b separately receive two channels, which may be different or may be the same, in receiving digital broadcasting signals in the UHF band.

Although the structure has two radio-frequency receiver sections 20a and 20b, the required number of oscillation circuits of oscillator section 21 is four (i.e., 24a, 24b, 24c and 24d), which is half the number of a conventional structure. That is, the number of inductors required in tuning circuits 27a, 27b, 27c and 27d constituting oscillation circuits 24a, 24b, 24c and 24d, respectively, can be reduced to half.

The inductors, because of a large footprint, have inconveniently increased in size the integrated circuit. According to the structure of the embodiment, however, the number of inductors can be reduced to half, compared to a conventional structure. This contributes to a downsized integrated circuit, which accordingly allows radio-frequency receiver 10 to have a compact structure.

Besides, the oscillation circuits 24a, 24b, 24c and 24d operate at oscillation frequencies four-times higher than the digital broadcasting signals, allowing the inductor to be more compact. As a result, the integrated circuit can be further decreased in size and the radio-frequency receiver 10 can be downsized.

A diversity receiving is obtained as follows: in FIG. 3, the control signal from PLL controller 35 activates one of the four oscillation circuits. The oscillation signal from the "turned-on" oscillation circuit is fed into frequency-divider sections 22a and 22b. After that, the output signals from sections 22a and 22b are fed into another input of each of mixers 16a and 16b. That is, selective switching circuit 25 receives an oscillation signal from the turned-on oscillation circuit and sends the signal to frequency-divider sections 22a and 22b. Diversity receiving is thus obtained.

Figure 3:
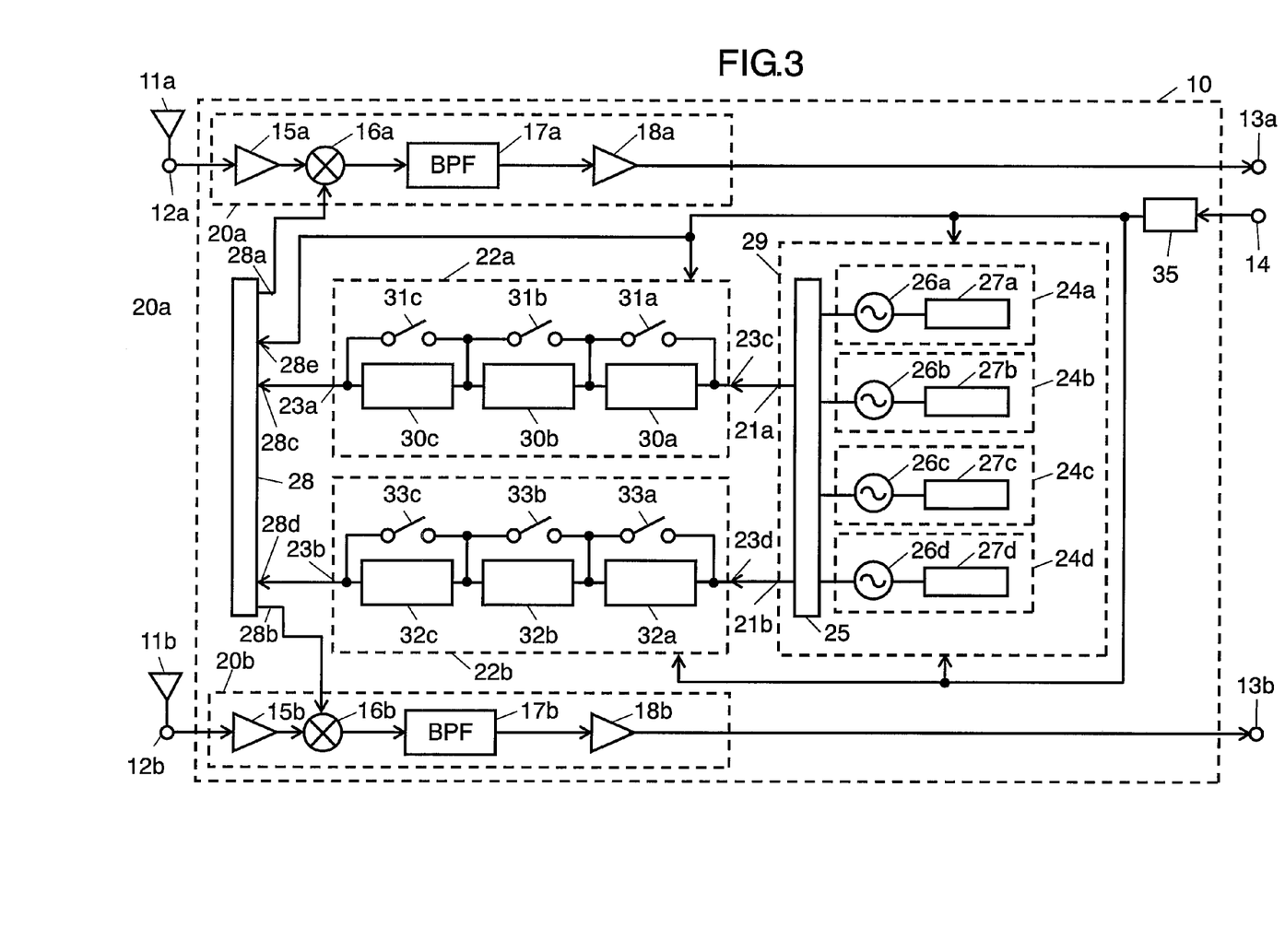
FIG. 3 is a block diagram illustrating another structure of the radio-frequency receiver in accordance with the first exemplary embodiment.

FIG. 3 is a block diagram illustrating another structure of radio-frequency receiver 10 of the first exemplary embodiment. In addition to the structure shown in FIG. 1, radio-frequency receiver 10 of FIG. 3 contains additional selective switching circuit 28 between frequency-divider sections 22a, 22b and mixers 16a, 16b. Selective switching circuit 28 contains, as shown in FIG. 3, output terminal 28a connected to another input of mixer 16a; output terminal 28b connected to another input of mixer 16b; input terminal 28c connected to frequency-divider section 22a; input terminal 28d connected to frequency-divider section 22b; and input terminal 28e connected to PLL controller 35. With the structure above, PLL controller 35 of radio-frequency receiver 10 controls oscillation circuits 26a, 26b, 26c and 26d so that any one of them turns on. At the same time, PLL controller 35 controls frequency-divider sections 22a and 22b so that either one of them operates at a frequency-dividing rate of ¼. Selected by selective switching circuits 25 and 28, the output signal fed from either one of frequency-divider sections 22a and 22b is fed into another input of each of mixers 16a and 16b. Diversity receiving of all the channels in the UHF band is thus obtained.

In the receiving above, the receiver needs power supply for only one of oscillation circuits 26a, 26b, 26c and 26d, and one of frequency-divider sections 22a and 22b, contributing to power savings.

Although the first exemplary embodiment describes a direct-conversion type frequency converter, it is not limited thereto; the structure of the present invention is also applicable to a down-conversion type frequency converter. That is, mixer 16a as a first mixer and mixer 16b as a second mixer serve as down-conversion type frequency converters. In this case, the frequency for frequency conversion fed into another input of mixer 16a is higher or lower than the frequency of the digital broadcasting signal fed into one input of mixer 16a by the intermediate frequency. Similarly, the frequency for frequency conversion fed into another input of mixer 16b is higher or lower than the frequency of the digital broadcasting signal fed into one input of mixer 16b by the intermediate frequency. The receiver can receive both of digital and analog broadcasting system by forming the receiver into the following structure: forming the oscillator section with four oscillation circuits 24a, 24b, 24c and 24d. Three out of the four circuits, each of which is responsible for a three-divided range of a frequency band that has frequency four-times higher than the digital broadcasting signal, generate oscillation signals suitable for each range. The rest one oscillation circuit has an oscillation frequency that contains the oscillation frequency of the oscillation circuit for the second range of the frequency band. Such structured receiver can cope with both the digital and analog broadcasting systems.

In a case where radio-frequency receiver section 20a receives a channel different from radio-frequency section 20b, two oscillation circuits turn on. If the operating two circuits generate oscillation frequencies in a close range, C/N (carrier-noise) ratio of both frequencies is degraded. In some cases, the oscillation frequency of one circuit is wrongly received by the mixer for receiving the frequency of the other oscillation circuit, so that interference can occur. To avoid the inconveniencies, each of the four oscillation circuits needs shielding separately in radio-frequency range.

Frequency-divider sections 22a and 22b also needs shielding in radio-frequency range because they generate harmonic signals in the frequency dividing process. That is, the following components are separately shielded at radio-frequency: frequency-divider section 22a as a first frequency-divider; frequency-divider section 22b as a second frequency-divider; and oscillator section 21 containing a plurality of oscillation circuits (24a, 24b, 24c, and 24d) and selective switching circuit 25 as a first selective switching circuit.

The harmonic signals fed from frequency-divider sections 22a and 22b easily cause interference by radiation. To reduce the ill effect caused by radiation, frequency-divider section 22a as a first frequency-divider is disposed close to mixer 16a as a first mixer, and frequency-divider section 22b as a second frequency-divider is disposed close to mixer 16b as a second mixer.

Second Exemplary Embodiment

Figure 4:
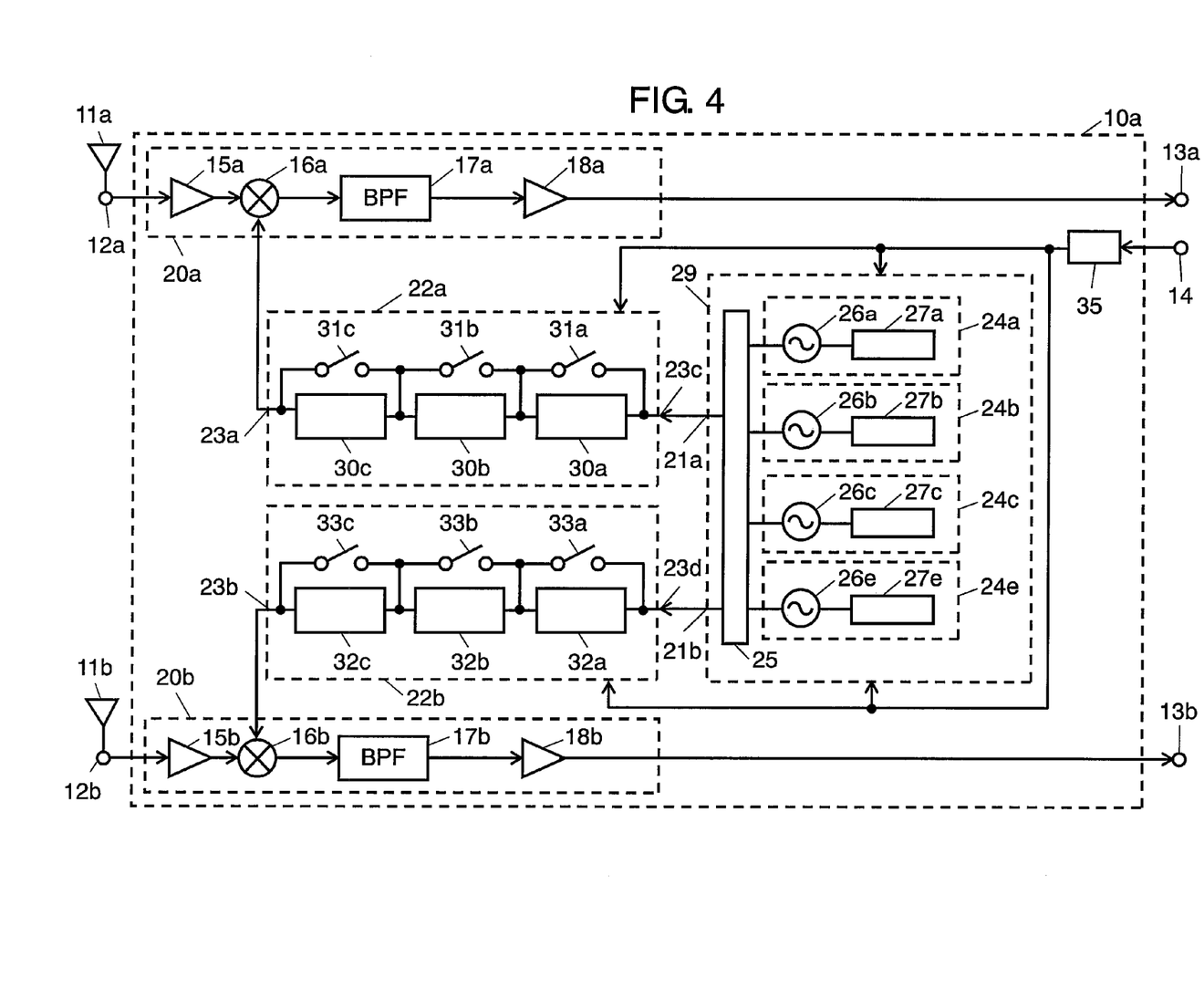
FIG. 4 is a block diagram illustrating the structure of a radio-frequency receiver in accordance with a second exemplary embodiment of the present invention.

FIG. 4 is a block diagram illustrating the structure of radio-frequency receiver 10a in accordance with the second exemplary embodiment. Radio-frequency receiver 10 in FIG. 1 of the first embodiment receives all the channels in the UHF band, whereas the radio-frequency receiver of the second embodiment receives all the channels in the UHF band, plus 7-ch in the VHF band. In the structure shown in FIG. 4, like parts are identified by the same reference marks as in FIG. 1 and detailed explanation thereof will be omitted.

Oscillator section 29 of FIG. 4 is formed of four oscillation circuits 24a, 24b, 24c and 24e. Oscillation circuit 24e corresponds to circuit 24d of the structure of the first embodiment, but differs from circuit 24d in the highest and the lowest frequencies. Oscillation circuit 24e is a unit of oscillator 26e and tuning circuit 27e connected to oscillator 26e.

Next will be described the output signals from frequency-divider sections 22a and 22b, which are fed into another input of each of mixers 16a and 16b, with reference to FIG. 5.

Figure 5:
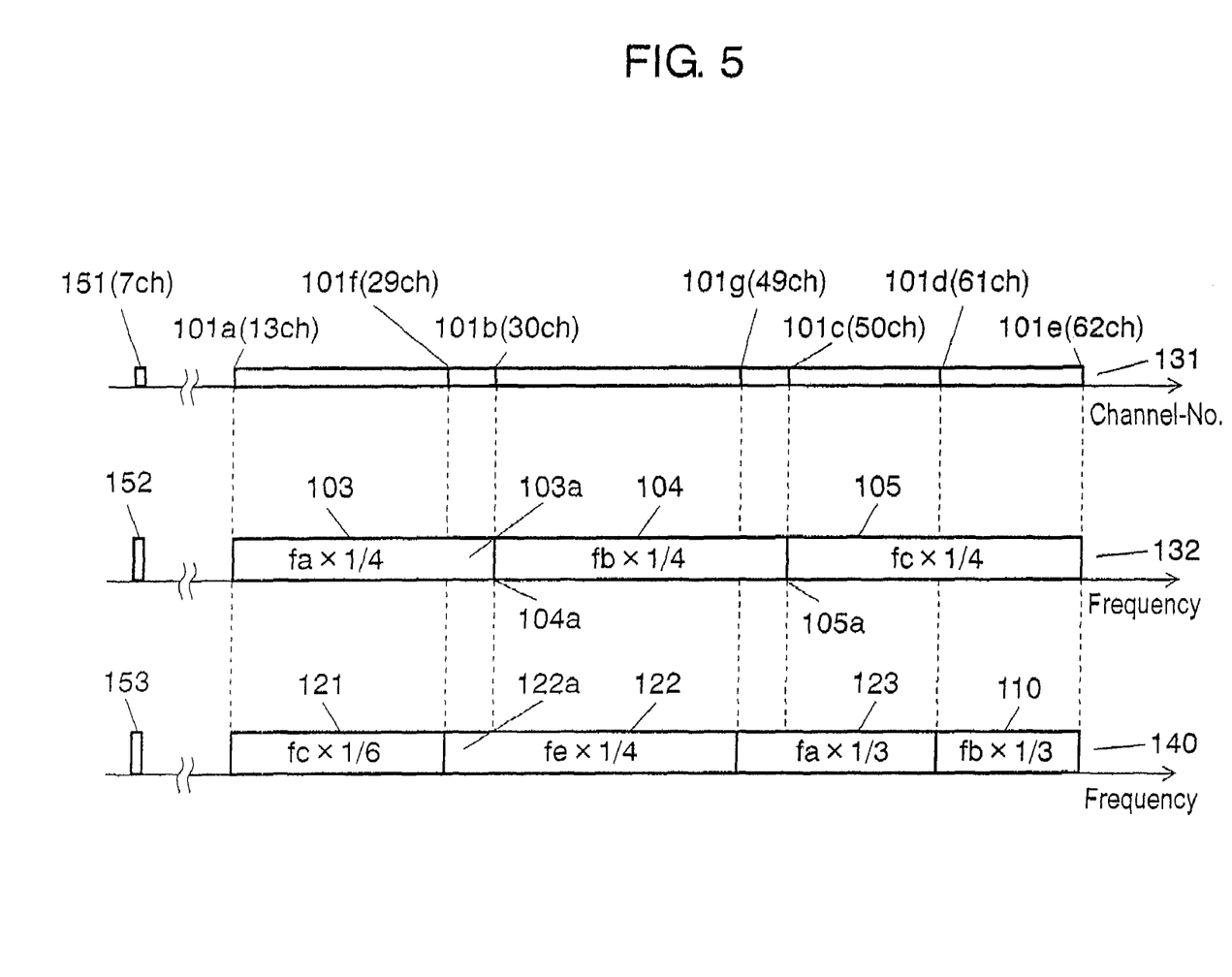
FIG. 5 shows a relationship between channel assignment of all channels in the UHF band plus 7-ch in the VHF band and the frequencies of signals fed into another input of a mixer of the radio-frequency receiver in accordance with the second exemplary embodiment.

FIG. 5 shows a relationship between channel assignment of all channels in the UHF band and 7-ch in the VHF band and the frequencies of signals fed into another input of a mixer of the radio-frequency receiver in accordance with the second exemplary embodiment. In the structure shown in FIG. 5, like parts are identified by the same reference marks as in FIG. 2 and detailed explanation thereof will be omitted.

The uppermost of FIG. 5 shows ch-assignment 131 of 7-ch in the VHF band and all the channels in the UHF band. The channels are horizontally shown in the order of increasing their numbers toward the right. The channels of 7-ch, 13-ch, 29-ch, 30-ch, 49-ch, 50-ch, 61-ch and 62-ch are represented as 151, 101a, 101f, 101b, 101g, 101c, 101d and 101e, respectively.

The middle section of FIG. 5 shows frequency 132 of the signal fed into another input of mixer 16a. Frequency 132 is divided into frequency bands 152, 103, 104 and 105 in the horizontal direction. The receiver receives all the channels in the UHF band by determining frequencies 103, 104 and 105 as is the case with the structure in the first exemplary embodiment. To receive frequency band 152, i.e., 7-ch in the VHF band, the receiver operates oscillation circuit 24a, which has an oscillation frequency ranging from 1892 MHz to 2300 MHz, at an oscillation frequency of 2292 MHz. Frequency-divider section 22a divides the oscillation frequency into ¼, and then further divides it into ⅓. After that, frequency-divider section 22a outputs a signal with a frequency of 191 MHz (corresponding to 7-ch), which is fed into another input of mixer 16a. In this way, radio-frequency receiver section 20a receives 7-ch as a desired channel.

Adding oscillation circuit 24e to the oscillator section allows radio-frequency receiver sections 20a and 20b to separately receive two channels—which may be different or may be the same—in receiving digital broadcasting signals in the UHF band. The method will be described below.

It has demonstrated that oscillation frequency 2415 of oscillation circuit 24e has a ratio of the lowest frequency to the highest frequency of 1.5 or greater; here in the structure, a conservative ratio of 1.2 is given to oscillation circuit 24e in consideration of a margin of the oscillation frequency.

The bottom section of FIG. 5 shows frequency 140 of the signal fed into another input of mixer 16b. Frequency 140 is divided into frequency bands 153, 121, 122, 123 and 110 in the horizontal direction. Oscillating frequencies 2413 (of oscillation circuit 24c), 2415 (of oscillation circuit 24e), 2411 (of oscillation circuit 24a) and 2412 (of oscillation circuit 24b) are divided by frequency-divider section 22b into the signal frequencies of frequency bands 121, 122, 123 and 110, respectively. Frequency-divider section 22b serves as a frequency divider with the following frequency dividing ratio: 6/1 for circuit 24c; ¼ for circuit 24e; ⅓ for circuit 24a and circuit 24b.

Frequency band 121 ranges from frequency 101a (13-ch) as the lowest to frequency 101f (29-ch) as the highest. That is, oscillation circuit 24c should take oscillation frequency 2413 ranging from 2838 MHz (=473 MHz×6, that is, six-times higher than frequency 101a (13-ch) as the lowest in band 121) to 3414 MHz (=569 MHz×6, that is, six-times higher than frequency 101f (29-ch) as the highest). FIG. 5 shows frequency band 121 as fc×⅙; where, fc represents oscillation frequency 2413.

Similarly, frequency band 122 ranges from frequency 101f (29-ch) as the lowest to frequency 101g (49-ch) as the highest. That is, oscillation circuit 24e should take oscillation frequency 2415 ranging from 2276 MHz (=569 MHz×4, that is, four-times higher than frequency 101f (29-ch) as the lowest in band 122) to 2756 MHz (=689 MHz×4, that is, four-times higher than frequency 101g (49-ch) as the highest). FIG. 5 shows frequency band 122 as fe×¼; where, fe represents oscillation frequency 2415.

Frequency band 123 ranges from frequency 101g (49-ch) as the lowest to frequency 101d (61-ch) as the highest. That is, oscillation circuit 24a should take oscillation frequency 2411 ranging from 2067 MHz (=689 MHz×3, that is, three-times higher than frequency 101g (49-ch) as the lowest in band 123) to 2283 MHz (=761 MHz×3, that is, three-times higher than frequency 101d (61-ch) as the highest). FIG. 5 shows frequency band 123 as fa×⅓; where, fa represents oscillation frequency 2411.

Frequency band 110 ranges from frequency 101d (61-ch) as the lowest to frequency 101e (62-ch) as the highest. That is, oscillation circuit 24b should take oscillation frequency 2412 ranging from 2283 MHz (=761 MHz×3, that is, three-times higher than frequency 101d (61-ch) as the lowest in band 110) to 2301 MHz (=767 MHz×3, that is, three-times higher than frequency 101e (62-ch) as the highest). FIG. 5 shows frequency band 110 as fb×⅓; where, fb represents oscillation frequency 2412.

To be more specific, when the receiver receives signals in the range from 13-ch to 29-ch, oscillation circuit 24a, which is the oscillator for frequency band 103, and oscillation circuit 24c for frequency band 121 become active. The oscillation signal from oscillation circuit 24a is fed into frequency-divider section 22a that serves as a ¼ divider, whereas the signal from oscillation circuit 24c is fed into frequency-divider section 22b that serves as a ⅙ divider. Each output signal from frequency-divider sections 22a and 22b is fed into another input of each of mixers 16a and 16b.

When the receiver receives signals in the range from 29-ch to 30-ch, oscillation circuit 24a, which is the oscillator for frequency band 103, and oscillation circuit 24e for frequency band 122 become active. The oscillation signals from oscillation circuits 24a and 24e are fed into frequency-divider sections 22a and 22b, both of which serve as a ¼ divider. Each output signal from frequency-divider sections 22a and 22b is fed into another input of each of mixers 16a and 16b.

When the receiver receives signals in the range from 30-ch to 49-ch, oscillation circuit 24b, which is the oscillator for frequency band 104, and oscillation circuit 24e for frequency band 122 become active. The oscillation signals from oscillation circuits 24b and 24e are fed into frequency-divider sections 22a and 22b, both of which serve as a ¼ divider. Each output signal from frequency-divider sections 22a and 22b is fed into another input of each of mixers 16a and 16b.

When the receiver receives signals in the range from 49-ch to 50-ch, oscillation circuit 24b, which is the oscillator for frequency band 104, and oscillation circuit 24a for frequency band 123 become active. The oscillation signal from oscillation circuit 24b is fed into frequency-divider section 22a that serves as a ¼ divider, whereas the signal from oscillation circuit 24a is fed into frequency-divider section 22b that serves as a ⅓ divider. Each output signal from frequency-divider sections 22a and 22b is fed into another input of each of mixers 16a and 16b.

When the receiver receives signals in the range from 50-ch to 61-ch, oscillation circuit 24c, which is the oscillator for frequency band 105, and oscillation circuit 24a for frequency band 123 become active. The oscillation signal from oscillation circuit 24c is fed into frequency-divider section 22a that serves as a ¼ divider, whereas the signal from oscillation circuit 24a is fed into frequency-divider section 22b that serves as a ⅓ divider. Each output signal from frequency-divider sections 22a and 22b is fed into another input of each of mixers 16a and 16b.

When the receiver receives signals in the range from 61-ch to 62-ch, oscillation circuit 24c, which is the oscillator for frequency band 105, and oscillation circuit 24b for frequency band 110 become active. The oscillation signal from oscillation circuit 24c is fed into frequency-divider section 22a that serves as a ¼ divider, whereas the signal from oscillation circuit 24b is fed into frequency-divider section 22b that serves as a ⅓ divider. Each output signal from frequency-divider sections 22a and 22b is fed into another input of each of mixers 16a and 16b.

As described above, a control signal from PLL controller 35 allows two oscillation circuits out of the four to become active according to a receiving channel. The oscillation signals fed from the two "turned-on" oscillation circuits are selected by selective switching circuit 25 and fed into frequency-divider sections 22a and 22b where the signals undergo frequency dividing. Each of sections 22a and 22b is controlled by PLL controller 35 so as to have a frequency-dividing rate of any one of ⅓, ¼ and ⅙. In this way, each signal having a desired frequency is fed into another input of each of mixers 16a and 16b.

With the structure above, radio-frequency receiver sections 20a and 20b separately receive two channels, which may be different or may be the same, in receiving digital broadcasting signals of the UHF band.

Next will be described a case where radio-frequency receiver sections 20a and 2b simultaneously receive 7-ch in the VHF band.

When radio-frequency receiver section 20a receives 7-ch, the receiver provides oscillation frequency 2411 of oscillation circuit 24a with 1/12 frequency dividing; oscillation frequency 2411 (=2292 MHz) of oscillation circuit 24a undergoes ¼ dividing, and then ⅓ dividing (i.e., 2292 MHz×¼×⅓=191 MHz). Frequency 103a (=573 MHz) is obtained by dividing oscillation frequency 2411 (=2292 MHz) into ¼.

When radio-frequency receiver section 20b receives 7-ch, the receiver provides oscillation frequency 2415 of oscillation circuit 24e with 1/12 frequency dividing; oscillation frequency 2415 (=2292 MHz) of oscillation circuit 24e undergoes ¼ dividing, and then ⅓ dividing (i.e., 2292 MHz×¼×⅓=191 MHz). Frequency 122a (=573 MHz) is obtained by dividing oscillation frequency 2415 (=2292 MHz) into ¼.

As described above, operating oscillation circuit 24a (for radio-frequency receiver section 20a) and oscillation circuit 24b (for radio-frequency receiver section 20b) allows the receiver to simultaneously receive VHF 7-ch.

According to the receiver of the embodiment, the frequency band of digital broadcasting signals, which is assigned in the UHF band, is divided into three: lower frequency band 103, intermediate frequency band 104 and higher frequency band 105. The receiver contains oscillation circuits 24a, 24b and 24c, which are responsible for frequency bands 103, 104 and 105, respectively. Lower frequency band 103, which includes frequency 103a in a high range, is determined in a manner that the oscillation frequency of oscillation circuit 24a is divided into ¼. At the same time, the frequency that is obtained by dividing frequency 103a into ⅓ is not lower than the frequency of VHF 7-ch (=191 MHz). That is, it is necessary that the oscillation frequency of oscillation circuit 24a is not lower than 2292 MHz (191 MHz×12).

Frequency band 122, which includes frequency 122a in a low range, is determined in a manner that the oscillation frequency of oscillation circuit 24e is divided into ¼, takes a range lower than intermediate frequency band 104. At the same time, the frequency that is obtained by dividing frequency 122a into ⅓ is not higher than the frequency of VHF 7-ch (=191 MHz). That is, it is necessary that the oscillation frequency of oscillation circuit 24e is not higher than 2292 MHz (191 MHz×12).

Operating oscillation circuit 24a and frequency-divider section 22a as a 1/12 divider allows radio-frequency receiver section 20a to receive 7-ch in the VHF band. Similarly, operating oscillation circuit 24e and frequency-divider section 22b as a 1/12 divider allows radio-frequency receiver section 20b to receive 7-ch in the VHF band.

According to radio-frequency receiver 10a of the second embodiment, as described above, the highest frequency of the oscillation circuit that is responsible for frequency band 103 as the lowest range of three-divided digital-broadcasting-signal band is equal to or higher than the lowest frequency of the remaining oscillation circuit. Frequency-divider section 22a as a first frequency-divider employs a frequency-dividing rate of ¼, on the other hand, frequency-divider section 22b as a second frequency-divider employs a frequency-dividing rate of any one of ⅓, ¼, ⅙, and 1/12. With the structure, the receiver of the embodiment receives all the channels in the UHF band plus 7-ch in the VHF band.

When receiving one and the same segment of 7-ch, the receiver may operates either one of two oscillation circuits 24a, 24e. In this case, the oscillation signal from the operated oscillation circuit is fed into frequency-divider sections 22a, 22b, both of which serve as a 1/12 divider. Each output signal from sections 22a and 22b is fed into another input of each of mixers 16a and 16b.

As another possible way to receive one and the same segment of 7-ch, the receiver additionally employs a second selective switching circuit between frequency-divider sections 22a, 22b and mixers 16a, 16b, and operates either one of two oscillation circuits 24a, 24e according to the control signal from PLL controller 35. The output signal from the operated oscillation circuit, via either one of the frequency-divider sections, is fed into another input of each of mixers 16a and 16b.

Figure 6:
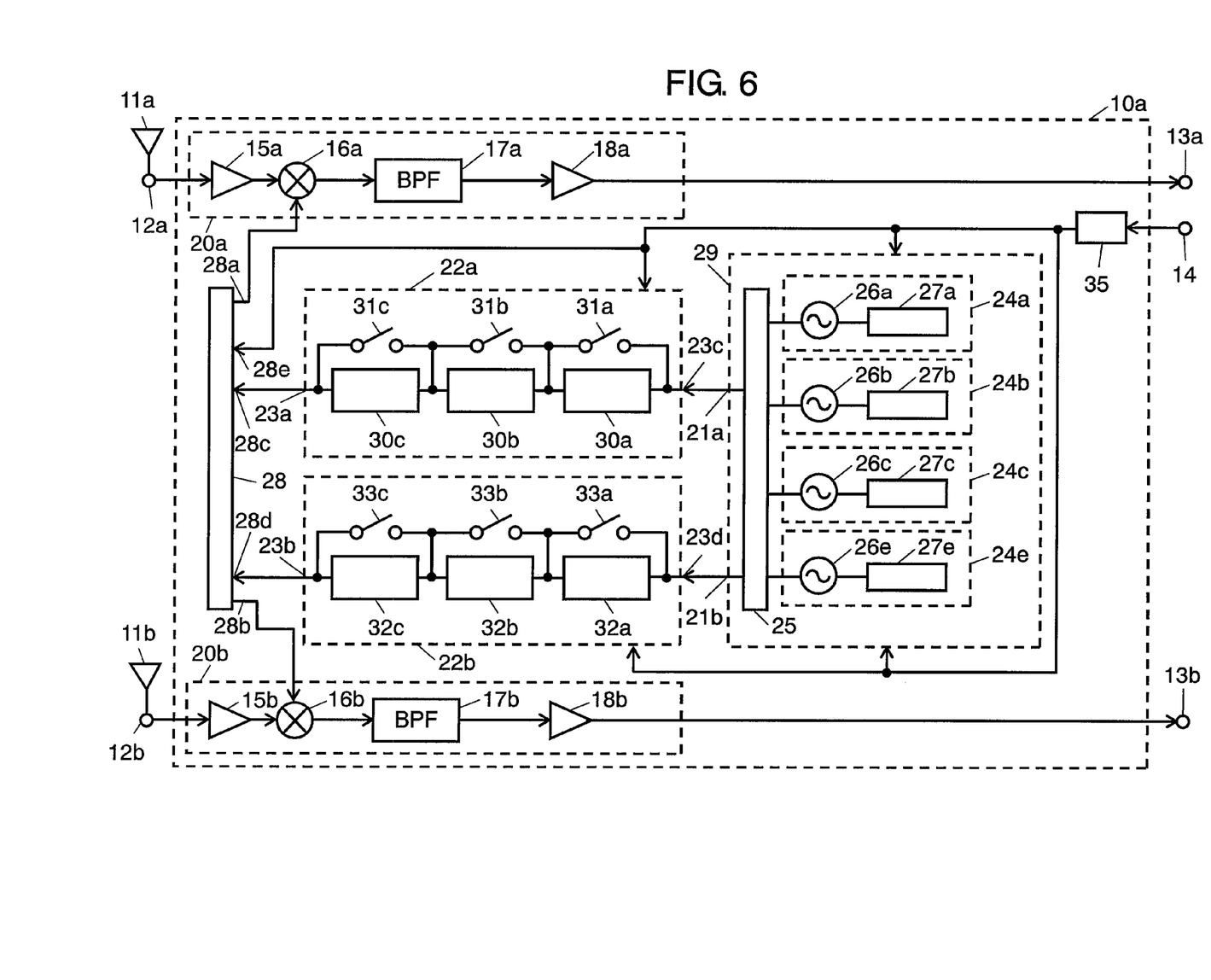
FIG. 6 is a block diagram illustrating another structure of the radio-frequency receiver in accordance with the second exemplary embodiment.

FIG. 6 is a block diagram illustrating another structure of radio-frequency receiver 10a of the second exemplary embodiment. In addition to the structure shown in FIG. 3, the radio-frequency receiver of FIG. 6 contains additional selective switching circuit 28 between frequency-divider sections 22a, 22b and mixers 16a, 16b. Selective switching circuit 28 contains, as shown in FIG. 6, output terminal 28a connected to another input of mixer 16a; output terminal 28b connected to another input of mixer 16b; input terminal 28c connected to frequency-divider section 22a; input terminal 28d connected to frequency-divider section 22b; and input terminal 28e connected to PLL controller 35. With the structure above, PLL controller 35 of radio-frequency receiver 10 controls oscillation circuits 26a, 26b, 26c and 26d so that any one of them turns on. At the same time, PLL controller 35 controls frequency-divider sections 22a and 22b so that either one of them has a frequency-dividing rate of ¼ or 1/12. Selected by selective switching circuits 25 and 28, an output signal from either one of frequency-divider sections 22a and 22b is fed into another input of each of mixers 16a and 16b. Diversity receiving of all the channels in the UHF band plus 7-ch in the VHF band is thus obtained.

In the structure above, selective switching circuit 25 selects the turned-on oscillation circuit and sends the signal fed from the selected circuit to the frequency-divider section that serves as a 1/12 divider. Receiving the output signal fed from the frequency-divider section, selective switching circuit 28 selectively feeds the signal to another input of each of mixers 16a and 16b. In this way, diversity receiving is obtained. In this case, the structure needs power supply for one of frequency-divider sections 22a and 22b, contributing to power savings.

When one and the same segment is received by two radio-frequency receiver sections, the oscillation frequency should be preferably produced by either one of the oscillation circuits. It is because that interference can occur between the similarly arranged oscillating frequencies of oscillation circuits 24a and 24e.

Although the structure has two radio-frequency receiver sections 20a and 20b, the required number of oscillation circuits of oscillator section 29 is four (i.e., 24a, 24b, 24c, and 24d), which is half the number of a conventional structure. That is, the number of inductors required in tuning circuits 27a, 27b, 27c and 27d constituting oscillation circuits 24a, 24b, 24c and 24d, respectively, can be reduced to half.

The inductors, because of a large footprint, have inconveniently increased in size the integrated circuit. According to the structure of the embodiment, however, the number of inductors can be reduced to half, compared to a conventional structure. This contributes to a downsized integrated circuit, which accordingly allows radio-frequency receiver 10a to have a compact structure.

Besides, oscillation circuits 24a, 24b, 24c and 24e operate at oscillation frequency four-times higher than that of the digital broadcasting signal, allowing the inductor to be more compact. This contributes to a size-reduced integrated circuit; accordingly, size-reduced radio-frequency receiver 10a.

According to the structure of the present invention, the oscillation circuit constituting the oscillator section can be formed of half the number of tuning circuits. The integrated circuit containing the oscillator section can be formed into a compact structure, and accordingly, a size-reduced radio-frequency receiver is obtained.

The structure of the second embodiment is built on the basic idea described in the first exemplary embodiment. Although the first and the second embodiments describe the frequency of the digital broadcasting signal based on the ch-assignment in Japan, it is not limited thereto; the idea is also applicable to the ch-assignment for a foreign country. Employing a similar structure based on the idea provides improvements, such as a shared-use of oscillation circuits and size-reduced inductors.

INDUSTRIAL APPLICABILITY

The radio-frequency receiver of the present invention has an oscillator section shareable between the two radio-frequency receiver sections. This allows the radio-frequency receiver to have a compact structure.

The invention claimed is:

1. A radio-frequency receiver comprising:
two radio-frequency receiving sections for receiving digital broadcasting signals including:
a first input terminal for receiving a digital broadcasting signal;
a second input terminal for receiving a digital broadcasting signal;
a first mixer whose one input receives a signal from the first input terminal;
a second mixer whose one input receives a signal from the second input terminal;
a first output terminal for receiving an output signal from the first mixer;
a second output terminal for receiving an output signal from the second mixer;
a PLL controller;
a plurality of low-voltage-driven oscillation circuits that is connected to the PLL controller and oscillates at a frequency higher than the digital broadcasting signal under control of the PLL controller;
a first selective switching circuit which is connected to outputs of the plurality of oscillation circuits and to the PLL controller for controlling, and has a first terminal and a second terminal;
a first frequency-divider section connected to the first terminal and another input of the first mixer; and
a second frequency-divider section connected to the second terminal and another input of the second mixer,
wherein, any of the oscillation circuits are connected to the first terminal and the second terminal, and frequency-dividing rates of the first frequency-divider section and the second frequency-divider section are respectively varied by controlling the first selective switching circuit at the PLL controller.

2. The radio-frequency receiver of claim 1,
wherein the first mixer is a direct-conversion type frequency converter in which a frequency of the digital broadcasting signal fed into one input of the first mixer equals to a frequency for conversion fed into another input of the first mixer, and the second mixer is a direct-conversion type frequency converter in which a frequency of the digital broadcasting signal fed into one input of the second mixer equals to a frequency for conversion fed into another input of the second mixer,
wherein the plurality of oscillation circuits is formed of four oscillation circuits, and three out of the four oscillation circuits divide a frequency band, which has a frequency four-times higher than that of the digital broadcasting signal, into three and oscillate, and
wherein an oscillation frequency of a remaining oscillation circuit contains an oscillation frequency of an oscillation circuit which oscillates a second range of the frequency band, and each of the first frequency-divider section and the second frequency-divider section has two $1/2$ frequency-dividers and one $1/3$ frequency-divider.

3. The radio-frequency receiver of claim 1,
wherein the first mixer is a down-conversion type frequency converter in which a frequency for frequency conversion fed into another input of the first mixer is higher or lower by an intermediate frequency than the frequency of the digital broadcasting signal, and the second mixer is a down-conversion type frequency converter in which a frequency for the frequency conversion fed into another input of the second mixer is higher or lower by the intermediate frequency than the frequency of the digital broadcasting signal fed into one input of the second mixer,
wherein the plurality of oscillation circuits is formed of four oscillation circuits, and three out of the four oscillation circuits divide a frequency band, which has a frequency four-times higher than that of the digital broadcasting signal, into three and oscillate, and
wherein an oscillation frequency of a remaining oscillation circuit contains an oscillation frequency of an oscillation circuit which oscillates a second range of the frequency band, and each of the first frequency-divider section and the second frequency-divider section has two $1/2$ frequency-dividers and one $1/3$ frequency-divider.

4. The radio-frequency receiver of claim 2,
wherein a frequency-dividing rate of the first frequency-divider section is set at $1/4$, and a frequency-dividing rate of the second frequency-divider section is set at any one of $1/3$, $1/4$ $1/6$, so that the receiver receives UHF all channels.

5. The radio-frequency receiver of claim 2,
wherein a highest frequency of an oscillation circuit that is responsible for a lowest range of the three-divided digital-broadcasting-signal band is equal to a lowest frequency of a remaining oscillation circuit, and
a frequency-dividing rate of the first frequency-divider section is set at $1/4$; and a frequency-dividing rate of the second frequency-divider section is set at any one of $1/3$, $1/4$, $1/6$ and $1/12$, so that the receiver receives UHF all channels and VHF 7-ch.

6. The radio-frequency receiver of claim 1,
wherein the first frequency-divider section, the second frequency-divider section and oscillator section having the plurality of oscillation circuits and the first selective switching circuit are separately shielded at a radio-frequency.

7. The radio-frequency receiver of claim 1,
wherein the first frequency-divider section is disposed close to the first mixer, and the second frequency-divider section is disposed close to the second mixer.

8. The radio-frequency receiver of claim 1 further comprising:
a second selective switching circuit having a control input terminal connected to the PLL controller between outputs of the first and the second frequency-divider sections and another inputs of the first and the second mixer,
wherein any one of the oscillation circuits is operated by the PLL controller, and a frequency-dividing rate of either one of the first frequency-divider section and the second frequency-divider section is set at $1/4$, and
an output signal from either one of the first frequency-divider section and the second frequency-divider section is fed into another input of each of the first mixer and the second mixer by the first selective switching circuit and the second selective switching circuit, so that diversity receiving of all the UHF channels is attained.

9. The radio-frequency receiver of claim 1 further comprising:
a second selective switching circuit having a control input terminal connected to the PLL controller between outputs of the first and the second frequency-divider sections and another inputs of the first and the second mixer, wherein any one of the oscillation circuits is operated by the PLL controller, and a frequency-dividing rate of either one of the first frequency-divider section and the second frequency-divider section is set at ¼ or ¹⁄₁₂, and an output signal from either one of the first frequency-divider section and the second frequency-divider section, at which the frequency-dividing rate is set, is fed into another input of each of the first mixer and the second mixer by the first selective switching circuit and the second selective switching circuit, so that diversity receiving of all the UHF channels and VHF 7-ch is attained.

10. An integrated circuit employed for the radio-frequency receiver of claim 1, wherein the integrated circuit contains at least the first mixer, the second mixer, the first frequency-divider section, the second frequency-divider section, the oscillator section which has the plurality of oscillation circuit and the first selective switching circuit, and the PLL controller in a same package.

11. The radio-frequency receiver of claim 3, wherein a frequency-dividing rate of the first frequency-divider section is set at ¼, and a frequency-dividing rate of the second frequency-divider section is set at any one of ⅓, ¼ and ⅙, so that the receiver receives UHF all channels.

12. The radio-frequency receiver of claim 3, wherein a highest frequency of an oscillation circuit that is responsible for a lowest range of the three-divided digital-broadcasting-signal band is equal to a lowest frequency of a remaining oscillation circuit, and a frequency-dividing rate of the first frequency-divider section is set at ¼; and a frequency-dividing rate of the second frequency-divider section is set at any one of ⅓, ¼, ⅙ and ¹⁄₁₂, so that the receiver receives UHF all channels and VHF 7-ch.

* * * * *